United States Patent
Ng Molina et al.

(10) Patent No.: US 12,538,237 B2
(45) Date of Patent: Jan. 27, 2026

(54) ML MODEL BASED POWER MANAGEMENT IN A WIRELESS COMMUNICATION NETWORK

(71) Applicant: Telefonaktiebolaget LM Ericsson (publ), Stockholm (SE)

(72) Inventors: Yak Ng Molina, Málaga (ES); Miguel Angel Regueira Caumel, Málaga (ES); Juan Ramiro Moreno, Málaga (ES); Adriano Mendo Mateo, Málaga (ES); Jose Outes Carnero, Torremolinos (ES); Paulo Antonio Moreira Mijares, Málaga (ES); Jose Maria Ruiz Aviles, Málaga (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 351 days.

(21) Appl. No.: 18/035,426

(22) PCT Filed: Jan. 27, 2021

(86) PCT No.: PCT/EP2021/051800
§ 371 (c)(1),
(2) Date: May 4, 2023

(87) PCT Pub. No.: WO2022/096156
PCT Pub. Date: May 12, 2022

(65) Prior Publication Data
US 2024/0007963 A1    Jan. 4, 2024

(30) Foreign Application Priority Data

Nov. 4, 2020   (EP) .................................... 20382954

(51) Int. Cl.
*H04W 52/24* (2009.01)
*H04L 41/14* (2022.01)
(Continued)

(52) U.S. Cl.
CPC ........... *H04W 52/24* (2013.01); *H04L 41/145* (2013.01); *H04L 41/16* (2013.01); *H04W 24/08* (2013.01)

(58) Field of Classification Search
None
See application file for complete search history.

(56) References Cited

U.S. PATENT DOCUMENTS

| 9,432,901 B1 * | 8/2016 | Kwan ........... H04W 36/008375 |
| 2013/0310048 A1 * | 11/2013 | Hunukumbure .. H04W 52/0206 455/443 |

(Continued)

FOREIGN PATENT DOCUMENTS

WO    2017146640 A1    8/2017

OTHER PUBLICATIONS

Korowajczuk, Leonhard (editor), "LTE, WIMAX, and WLAN network design, optimization, and performance analysis", John Wiley & Sons, 2011, 784 pages.

(Continued)

*Primary Examiner* — Lester G Kincaid
(74) *Attorney, Agent, or Firm* — Sage Patent Group (57) ABSTRACT

A computer-implemented method for optimization of downlink (DL) transmit powers in a wireless communication network includes acquiring deployment data describing a deployment of a cluster of cells of the wireless communication network. Further, the method includes acquiring measurement data representing measurements performed with respect to a plurality of connections established between wireless devices and the wireless communication network. Further, the method includes, based on the deployment data and the measurement data, emulating effects of applying different DL transmit powers in at least some cells on the plurality of connections. Further, the method includes (Continued)

estimating state information for each of the cells based on the emulated effects. Further, the method includes, based on the estimated state information, training a machine learning (ML) model for optimization of the DL transmit powers of the cells.

20 Claims, 9 Drawing Sheets

(51) Int. Cl.
*H04L 41/16* (2022.01)
*H04W 24/08* (2009.01)

(56) References Cited

U.S. PATENT DOCUMENTS

| | | | | |
|---|---|---|---|---|
| 2015/0126193 | A1* | 5/2015 | Huang | H04W 36/0085 |
| | | | | 455/436 |
| 2015/0126209 | A1* | 5/2015 | Gloss | H04W 72/542 |
| | | | | 455/452.1 |
| 2016/0205697 | A1* | 7/2016 | Tan | H04W 24/02 |
| | | | | 370/329 |
| 2016/0255509 | A1* | 9/2016 | Imran | H04W 64/003 |
| | | | | 455/414.2 |
| 2016/0262038 | A1* | 9/2016 | Dunn | H04L 41/0886 |
| 2019/0068443 | A1 | 2/2019 | Li et al. | |

OTHER PUBLICATIONS

Francois-Lavet, Vincent et al., "An Introduction to Deep Reinforcement Learning," in Foundations and Trends in Machine Learning, Now Publishers Inc., 2019, 140 pages.

International Search Report and Written Opinion of the International Searching Authority, PCT/EP2021/051800, mailed Jul. 9, 2021, 10 pages.

Lee, Woongsup et al., "Application of End-to-End Deep Learning in Wireless Communications Systems," arXiv.org, Aug. 7, 2018, 14 pages.

* cited by examiner

ML MODEL BASED POWER MANAGEMENT IN A WIRELESS COMMUNICATION NETWORK

CROSS REFERENCE TO RELATED APPLICATIONS

This application is a 35 U.S.C. § 371 national stage application of PCT International Application No. PCT/EP2021/051800 filed on Jan. 27, 2021, which in turn claims foreign priority to European Patent Application No. 20382954.4, filed on Nov. 4, 2020, the disclosures and content of which are incorporated by reference herein in their entirety.

TECHNICAL FIELD

The present invention relates to methods for controlling transmissions in a wireless communication network and to corresponding devices, systems, and computer programs.

BACKGROUND

In wireless communication networks, e.g., as specified by 3GPP ($3^{rd}$ Generation Partnership Project), there is a need to manage operation of the wireless communication network in order to meet performance targets, e.g., in terms of coverage, throughput or capacity. Here, one relevant parameter which can be considered is the downlink (DL) transmit power utilized in the individual cells of the wireless communication network.

Finding proper settings of the DL transmit powers of the cells is a rather complex problem, because a change of the DL transmit power in one cell not only has effects on the performance of this particular cell, but also on neighboring cells, e.g., due to changed interference levels. It may thus occur that an improvement in a given cell comes at the cost of a degradation in a surrounding area of this cell, which could even lead to a degradation of overall performance.

In view of the above-situation, values of the DL transmit powers of the cells are typically decided in a greenfield design phase and then only rarely further modified during operation of the wireless communication network. For example, such modifications could happen in the case of operational problems, e.g., when an overshooting cell causes excessive error events, and then be addressed by manual intervention of network experts.

On the other hand, an optimization of the DL transmit powers can provide various benefits, such as reduced overall interference, enabling reshaping of service areas for capacity purposes, or decreasing the total amount of radiated power in view of energy saving.

Known approaches to optimize the DL transmit powers in a wireless communication network are for example described in "LTE, WIMAX, and WLAN network design, optimization, and performance analysis", Korowajczuk, Leonhard (eds.), John Wiley & Sons (2011). Such known approaches include utilization of 3PP ($3^{rd}$ party planning) tools, which rely on propagation models to assess the effects of a power change, and analytical approaches, where decisions are taken based on KPI (Key Performance Indicator) analysis and predefined rules.

However, utilization of 3PP tools in order to estimate the impact of changes in the DL transmit powers is a challenging task, e.g., due to the difficulties to accurately characterize the radio environment with mathematical models. For example, such characterization may require extensive propagation model tuning campaigns and carefully curated input data, such as clutter and terrain maps. Depending on the utilized frequencies, it may even be required to utilize 3D modelling of the radio environment. This may result in considerable costs of such 3PP tools. Further, regarding the effects of the changes in the DL transmit powers on performance, it may also be required to consider typical user distribution and traffic profiles, which may be extremely difficult to model, e.g., using Monte Carlo simulations based on various assumptions. Such assumptions may introduce significant uncertainty in the obtained optimized values.

Further, also utilization of a KPI analysis or live recordings from the network to understand the circumstances in which a change of DL transmit powers might be beneficial involves high complexity and may for example require definition of dynamic or static thresholds that must be reviewed and adapted to each specific network deployment. Further, the utilized rules are typically defined at cell level and thus would not take into account effects on neighboring cells or other effects on a larger scale. Further, it may be difficult to consider effects on uplink (UL) coverage and service quality, which may result in an uplink unbalance, e.g., configurations where heterogeneous power configurations result in users not being served by the cell offering the lowest pathloss.

Accordingly, there is a need for techniques which allow for efficiently optimizing DL transmit powers in a wireless communication network.

SUMMARY

According to an embodiment, a computer-implemented method of controlling user data traffic in a wireless communication network is provided. The method comprises acquiring deployment data describing a deployment of a cluster of cells of the wireless communication network. Further, the method comprises acquiring measurement data representing measurements performed with respect to a plurality of connections established between wireless devices and the wireless communication network. Further, the method comprises, based on the deployment data and the measurement data, emulating effects of applying different DL transmit powers in at least some cells on the plurality of connections. Further, the method comprises estimating state information for each of the cells based on the emulated effects.

Further, the method comprises, based on the estimated state information, training a machine learning (ML) model for optimization of the downlink transmit powers of the cells.

According to a further embodiment, a node for a wireless communication network is provided. The node is adapted to acquire deployment data describing a deployment of a cluster of cells of the wireless communication network. Further, the node is adapted to acquire measurement data representing measurements performed with respect to a plurality of connections established between wireless devices and the wireless communication network. Further, the node is adapted to, based on the deployment data and the measurement data, emulate effects of applying different DL transmit powers in at least some cells on the plurality of connections. Further, the node is adapted to estimate state information for each of the cells based on the emulated effects. Further, the node is adapted to, based on the estimated state information, train an ML model for optimization of the downlink transmit powers of the cells.

According to a further embodiment, a node for a wireless communication network is provided. The node comprises at least one processor and a memory. The memory contains instructions executable by said at least one processor, whereby the node is operative to acquire deployment data describing a deployment of a cluster of cells of the wireless communication network. Further, the memory contains instructions executable by said at least one processor, whereby the node is operative to acquire measurement data representing measurements performed with respect to a plurality of connections established between wireless devices and the wireless communication network. Further, the memory contains instructions executable by said at least one processor, whereby the node is operative to, based on the deployment data and the measurement data, emulate effects of applying different DL transmit powers in at least some cells on the plurality of connections. Further, the memory contains instructions executable by said at least one processor, whereby the node is operative to estimate state information for each of the cells based on the emulated effects. Further, the memory contains instructions executable by said at least one processor, whereby the node is operative to, based on the estimated state information, train an ML model for optimization of the downlink transmit powers of the cells.

According to a further embodiment of the invention, a computer program or computer program product is provided, e.g., in the form of a non-transitory storage medium, which comprises program code to be executed by at least one processor of a node for a wireless communication network. Execution of the program code causes the node to acquire deployment data describing a deployment of a cluster of cells of the wireless communication network. Further, execution of the program code causes the node to acquire measurement data representing measurements performed with respect to a plurality of connections established between wireless devices and the wireless communication network. Further, execution of the program code causes the node to, based on the deployment data and the measurement data, emulate effects of applying different DL transmit powers in at least some cells on the plurality of connections. Further, execution of the program code causes the node to estimate state information for each of the cells based on the emulated effects. Further, execution of the program code causes the node to, based on the estimated state information, train an ML model for optimization of the downlink transmit powers of the cells.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to management of DL transmit powers in a wireless communication network. The wireless communication network may be based on various technologies, e.g., the 4G ($4^{th}$ Generation) LTE (Long Term Evolution) technology or the 5G ($5^{th}$ Generation) NR (New Radio) technology specified by 3GPP. Nonetheless it is to be understood the illustrated concepts could also be additionally or alternatively applied in connection with other technologies, e.g., the 3G ($3^{rd}$ Generation) UMTS (Universal Mobile Telecommunications System) technology specified by 3GPP, a WLAN (Wireless Local Area Network) technology, or any combination of two or more of the above-mentioned technologies.

The illustrated concepts aim at optimization of the DL transmit powers by utilization of an ML model. In the illustrated concepts, the ML model is assumed to be based on deep reinforcement learning. However, it is noted that similar principles could also be applied in connection with other types of ML, e.g., based on other types of reinforcement learning, such as reinforcement learning based on a Monte Carlo method, based on a temporal difference method, or based on direct policy search. Further, the illustrated principles could also be applied in connection with ML based on supervised learning or unsupervised learning.

In the illustrated principles, training of the ML model is based on emulated data. In particular, the effects of changes of the DL transmit powers in a cluster of cells of the wireless communication network are emulated based on, on the one hand, deployment data describing deployment of the cells of the cluster, and measurement data representing measurements on connections between wireless devices and the wireless communication network, e.g., collected from Cell Traffic Recordings (CTRs). In the following, such wireless devices are also denoted as UE (user equipment). Here, it is noted that such wireless device or UE may correspond to various types of devices supporting wireless communication in a wireless communication network, including for example mobile phones, mobile or stationary computers, vehicles or vehicle-based devices, MTC (machine-type communication) devices, IoT (Internet of Things) devices, or the like.

The measurement data may be used to assess performance in the cluster of cells with respect to actually applied DL transmit powers, e.g., in terms of one or more KPIs. The emulation allows to extrapolate similar KPIs also for changed values of at least some of the DL transmit powers of the cells. Accordingly, the basis for training the ML model can be widened beyond the available measurement data to enable efficient training of the ML model. In this way, it can be taken into account that typically the DL transmit powers are only rarely changed during operation of a wireless communication network, so that the available measurement data are not sufficient to properly train a ML model for optimization of the DL transmit powers. Once the ML model is trained, it can also be applied in an offline mode to derive optimized DL transmit powers from newly obtained measurement data.

Figure 1:
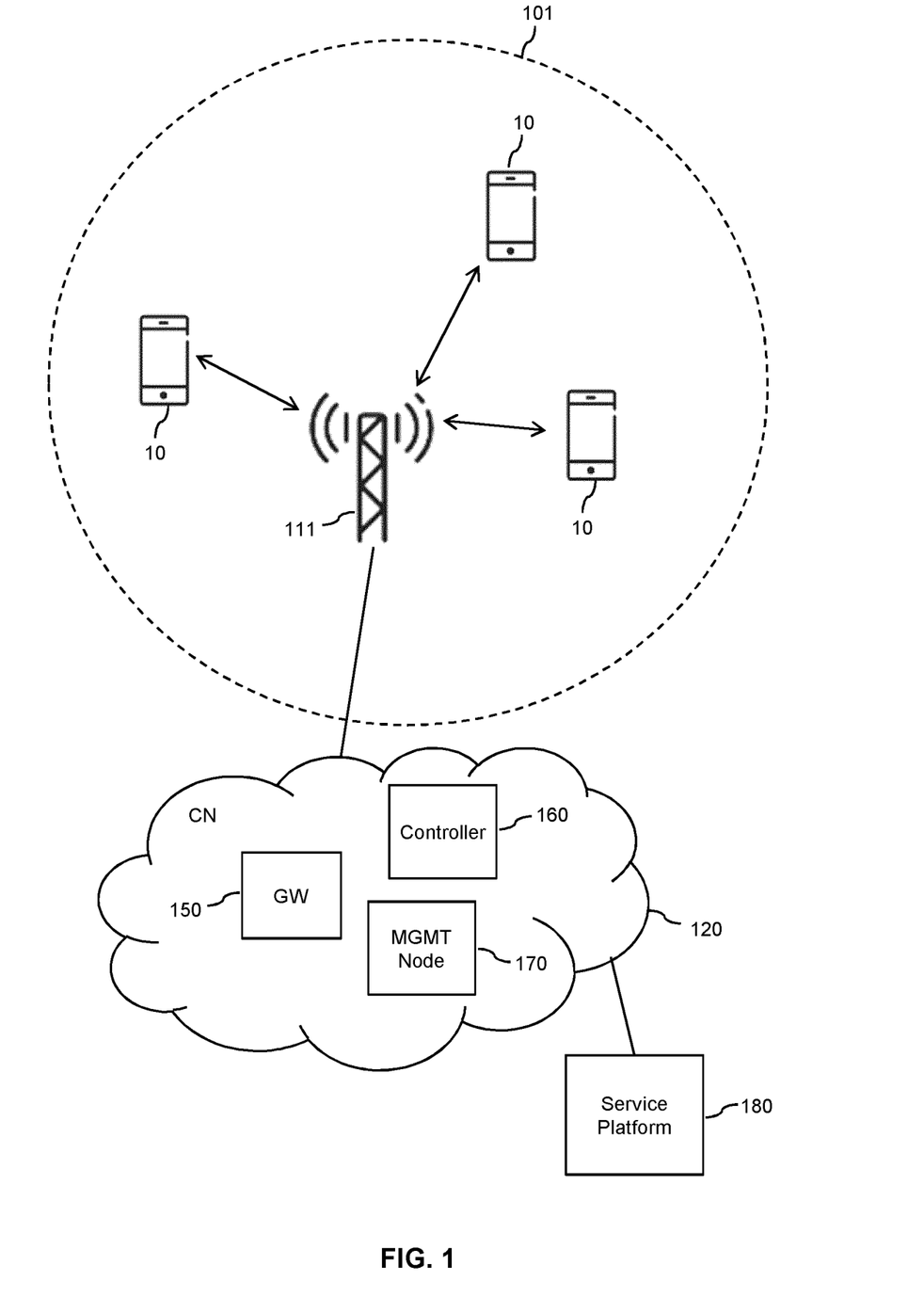
FIG. 1 schematically illustrates components of an exemplary wireless communication network according to an embodiment.

FIG. 1 illustrates exemplary structures of the wireless communication network. In particular, FIG. 1 shows multiple UEs 10 in a cell 101 of the wireless communication network. The cell 101 is assumed to be served by an access node 111, e.g., a gNB of the 5G NR technology or an eNB of the 4G LTE technology. The access node 111 may be regarded as being part of an RAN (Radio Access Network) of the wireless communication network. Further, FIG. 1 schematically illustrates a CN (Core Network) 120 of the wireless communication network. In FIG. 1, the CN 120 is illustrated as including a GW (gateway) 150, a controller 160, and a management (MGMT) node 170. The GW 150 is responsible for handling user data traffic of the UEs 10, e.g., by forwarding user data traffic from a UE 10 to a network destination or by forwarding user data traffic from a network source to a UE 10. Here, the network destination may correspond to another UE 10, to an internal node of the wireless communication network, or to an external node which is connected to the wireless communication network. Similarly, the network source may correspond to another UE 10, to an internal node of the wireless communication network, or to an external node which is connected to the wireless communication network. The controller 160 may in turn be responsible for controlling the user data traffic, e.g., with respect to connection establishment and/or mobility. The controller could for example correspond to an AMF (Access and Mobility Management Function) of the NR technology or an MME (Mobility Management Entity) of the LTE technology. The management node 170 may have the purpose of monitoring and/or controlling various parameters relevant to operation of the wireless communication network, such as a DL transmit power applied by the access node 111.

As illustrated by double-headed arrows, the access node 111 may send DL transmissions to the UEs, and the UEs may send UL transmissions to the access node 111. The DL transmissions and UL transmissions may be used to provide various kinds of services to the UEs, e.g., a voice service, a multimedia service, or a data service. Such services may be hosted in the CN 120, e.g., by a corresponding network node. Further, such services may be hosted externally, e.g., by an AF (application function) connected to the CN 120. By way of example, FIG. 1 illustrates a service platform 180 provided outside the wireless communication network. The service platform 180 could for example connect through the Internet or some other wide area communication network to the CN 120. The service platform 180 may be based on a server or a cloud computing system and be hosted by one or more host computers. The service platform 180 may include or be associated with one or more AFs that enable interaction of the service platform 180 with the CN 120. The service platform 180 may provide one or more services to the UEs 10, corresponding to one or more applications. These services or applications may generate the user data traffic conveyed by the DL transmissions and/or the UL transmissions between the access node 111 and the respective UE 10. Accordingly, the service platform 180 may include or correspond to the above-mentioned network destination and/or network source for the user data traffic.

It is noted that the wireless communication network may actually include more access nodes for serving multiple cells in a similar way as explained for the access node 111 and the cell 101. Further, it is noted that in some scenarios the service platform 180 could at least in part also be provided in the CN 120 and/or in the RAN of the wireless communication network.

Figure 2:
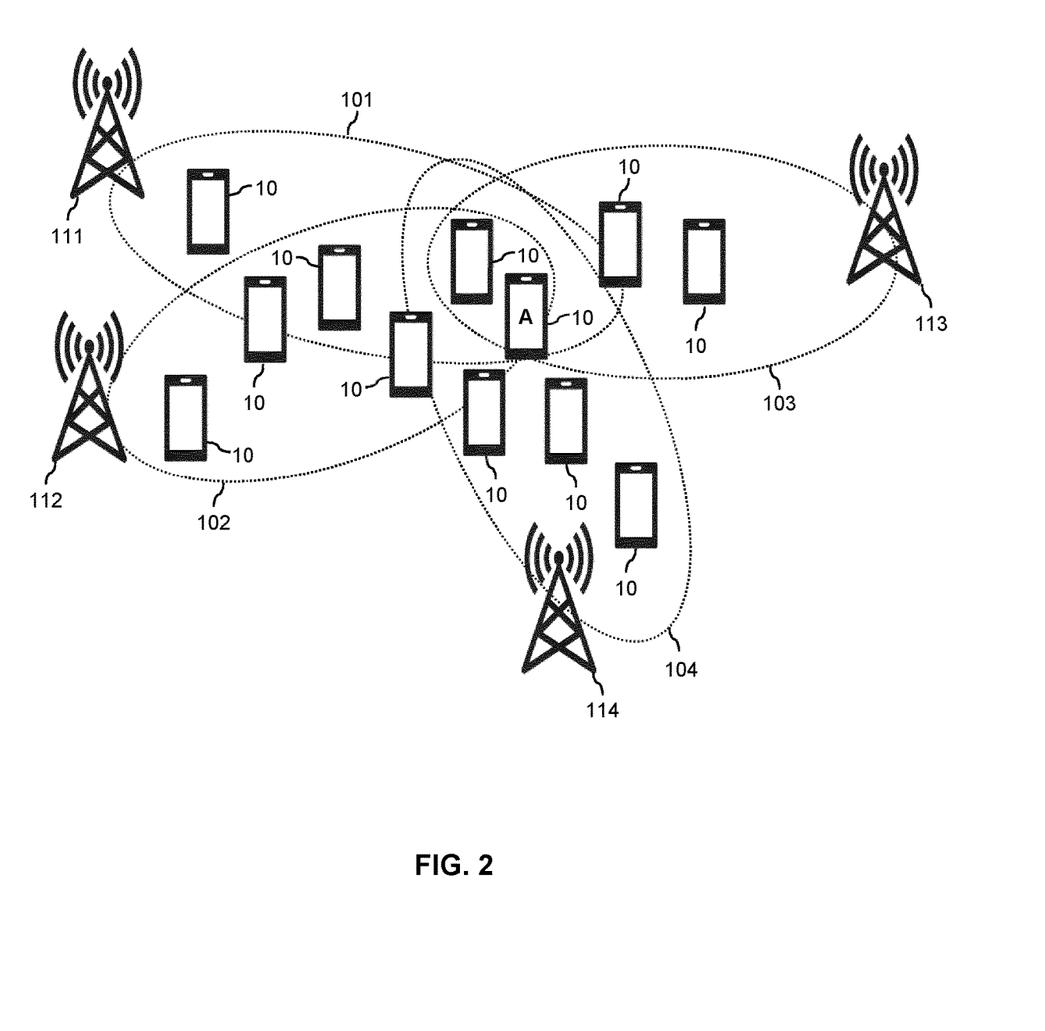
FIG. 2 schematically illustrates an exemplary scenario in which optimization of DL transmit powers according to an embodiment is applied.

FIG. 2 schematically shows an example of a scenario in which the illustrated concepts are applied for optimizing the DL transmit powers of a cluster of cells 101, 102, 103, 104. Here, it is noted that each of the cells 101, 102, 103, 104 may be part of structures as illustrated in FIG. 1. Accordingly, each of the cells 101, 102, 103, 104 could be connected to the CN 120 and operation of one or more UEs 10 in the cells 101, 102, 103, 104 may be as explained in connection with FIG. 1. As further illustrated, each of the cells 101, 102, 103, 104 is served by a corresponding access node 111, 112, 113, 114. In particular, the cell 101 is served by access node 111, the cell 102 is served by access node 112, and the cell 103 is served by access node 104. As mentioned above, these access nodes 111, 112, 113, 114 may correspond to a gNB of the NR technology or to an eNB of the LTE technology. When serving its respective cell 101, 102, 103, 104, each of the access nodes 111, 112, 113, 114 applies a corresponding DL transmit power. The DL transmit powers may be set based on control signaling from one or more other nodes of the wireless communication network. Further, FIG. 2 illustrates a plurality of UEs 10 which may establish connections to the wireless communication network. As illustrated, multiple UEs 10 may be located within the coverage area of the same cell 101, 102, 103, 104, i.e., multiple connections to UEs 10 may simultaneously exist in one cell 101, 102, 103, 104. As further illustrated, the cells 101, 102, 103, 104 may also have an overlap of their coverage areas, and one or more of the UEs 10 can be located within such overlapping part of two or more coverage areas. The extent of such overlap of two or more coverage areas typically depends on the levels of the DL transmit powers applied by the access nodes 111, 112, 113, 114. Further, it typically also depends on the levels of the DL transmit powers applied by the access nodes 111, 112, 113, 114 to which of the cells 101, 102, 103, 104 a UE 10 at a given location will establish its connection, i.e., which of the cells 101, 102, 103, 104 will be the serving cell of the UE's 10 connection.

As outlined above, the illustrated concepts involve emulating effects of changes of the DL transmit powers of at least some of the cells starting form measurement data and information on the deployment of the cells. These emulated effects are then used as a basis for training the ML model. In the following, the illustrated concepts will be explained in more detail by referring to an exemplary implementation which is based on a network emulator operating on the basis of UE traces from collected CTRs and an optimizer based on deep reinforcement learning. The UE traces may in particular include information on the connections as established by UEs 10.

Figure 3:
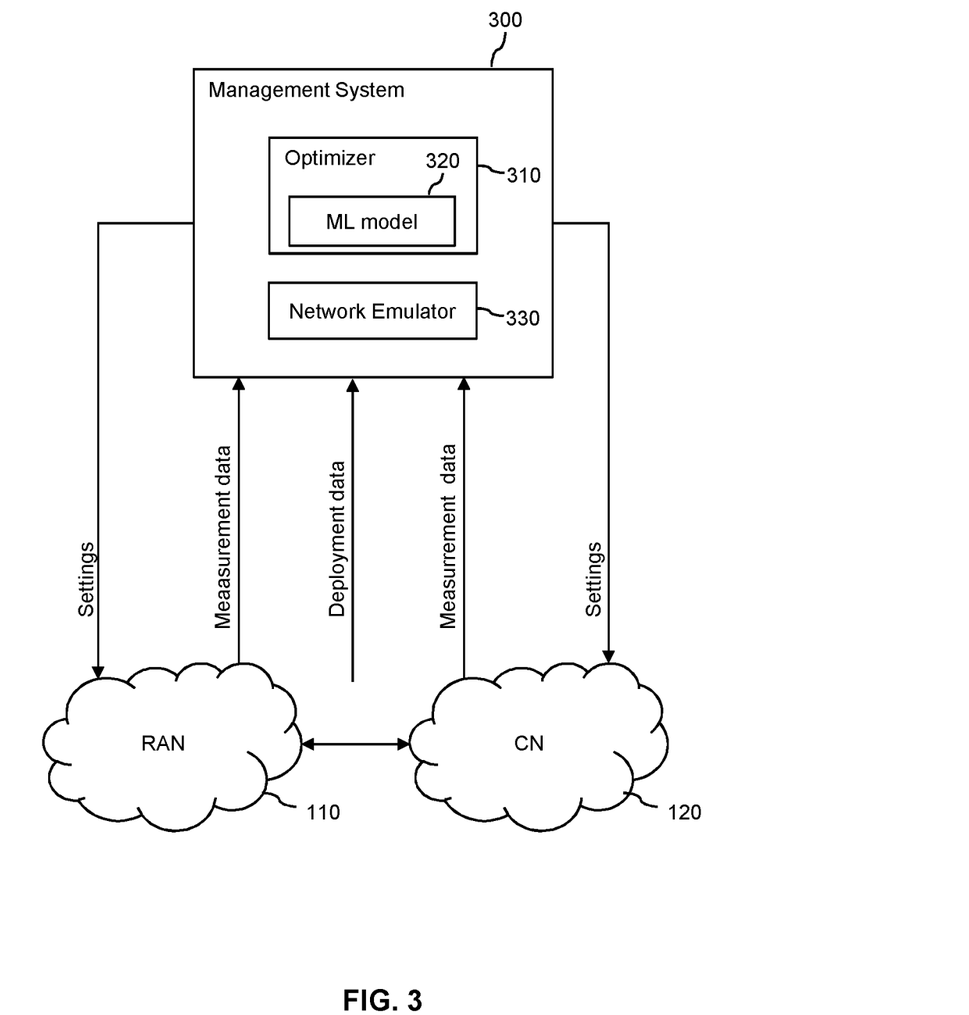
FIG. 3 schematically illustrates an optimization system according to an embodiment.

FIG. 3 further illustrates an exemplary architecture for implementation of the illustrated concepts. Specifically, FIG. 3 illustrates the RAN 110 of the wireless communication network, the CN 120 of the wireless communication network, and a management system 300 implementing the above-mentioned optimizer 310, which is based on the ML model 320, and the network emulator 330. Although FIG. 3 illustrates the management system 310 as a separate element, it is noted that at least a part of the management system 310 could be implemented by one or more nodes of the CN 120, e.g., by the management node 170.

In the illustrated example, the network emulator 330 operates on the basis of measurement data collected on the control plane of all connections established by the UEs 10 and stored in a database. The stored measurement data include signal strength measurements performed by the UEs 10, e.g., RSRP (Reference Signal Received Power) of the serving cell of the UE's connection and the RSRPs of neighboring cells of the serving cell. These data are assumed to be collected per connection. Accordingly, the database may cover data measured for multiple connections of each UE 10 and these connections may have been established at different times, for different durations, and with respect different cells 101, 102, 103, 104. The measurement data may thus provide a characterization of the radio environment of the cells 101, 102, 103, 104, e.g., in terms of coverage and interference. This characterization is valid for DL transmit powers of the cells 101, 102, 103, 104 as applied while the measurements were performed. Here, it is noted that in some cases, the measurement data could also include measurements obtained at different values of the DL transmit power of a given cell 101, 102, 103, 104, if the DL transmit power of the cell 101, 102, 103, 104 was modified in the period of collecting the measurement data. Further, the measurement data also include information on the traffic demand of each connection. The latter information may be used to derive KPIs of the cells 101, 102, 103, 104, e.g., in terms of data throughput per user, data throughput per cell, and/or utilization of available radio resource, e.g., in terms of DL PRB (Physical Resource Block) utilization.

The network emulator 330 may estimate the effects of changes of the DL transmit powers by assuming that a change of the DL transmit power of a given cell 101, 102, 103, 104 translates into a corresponding, in particular proportional, change of the signal strengths measured from this cell 101, 102, 103, 104. For example, if the access node 111 serving the cell 101 increases its DL transmit power by 10%, the network emulator would assume that also the RSRPs measured by the UEs 10 with respect to the cell 101 increase by 10%. In some cases, the network emulator may also take into account that such change of the measured signal strengths would result in a different selection of the serving cell of the UE 10. For example, when considering the UE 10, which in FIG. 2 is marked by "A", the measurement data could include a data record relating to a measurement performed for a connection of the UE 10 to the cell 104, i.e., for this data record the cell 104 would be the serving cell and the other cells 101, 102, 103 would be neighboring cells. Based on the assumed change of the DL transmit power of the access node 111 and the resulting estimated changes of the RSRP, the network emulator 330 can assume that the UE 10 would rather have established the connection to the cell 101. The network emulator 330 would thus create a new data record in which the cell 101 is the serving cell of the UE 10, and which includes the modified RSRP values estimated by the network emulator. In a similar way as the original measurement data, this new data record can be used as a basis for deriving KPIs. The network emulator 330 may perform such estimations for different changes of the DL transmit power, e.g., randomly selected changes, of the DL transmit power of al cells 101, 102, 103, 104, to thereby obtain a plurality of new data records corresponding to different DL transmit power values of the cells 101, 102, 103, 104. These new data records are then used as input for training the ML model used by the optimizer 320, optionally together with the data records of the original measurement data. Accordingly, the ML model can be efficiently and precisely trained, even if the original measurement data is based on a single setting of the DL transmit power of each of the cells 101, 102, 103, 104, or covers only few variations of the DL transmit powers.

In the assumed exemplary implementation, inputs of the network emulator 330 include UE measurements and deployment data, including cell configuration data and physical parameters. The measurement data may be obtained from one or more nodes of the RAN 110 and/or from one or more nodes of the CN 120. The deployment data may be manually configured in the management system and/or be obtained from data already available in the management system. As further illustrated in FIG. 3, the management system 310 may also provide settings to one or more nodes of the RAN 110 and/or to one or more nodes of the CN 120. These settings may in particular include optimized values of the DL transmit powers to be applied by at least some of the access nodes 111, 112, 113, 114 in the RAN 110. Such settings may be indicated by control signaling provided directly to the respective access node 111, 112, 113, 114 and/or indirectly by control signaling provided to one or more nodes of the CN 120, which then further propagate the settings to the respective access node 111, 112, 113, 114.

The UE measurements are collected and stored per connection, e.g., from CTRs. The UE measurements include the following information elements per connection:

cell identifier of the serving cell, e.g., in terms of NCI (New Radio Cell Identity) or ECI (E-UTRAN Cell Identifier), RSRP level of the serving cell, PCI of each measured neighbor cell, for up to eight neighbor cells, RSRP of each measured neighbor cell, for up to eight neighbor cells, UE reference used between RAC (Radio Admission Control) layer and baseband layer (RAC UE REF), data volume, e.g., in terms of a number of PDCP (Packet Data Convergence Protocol) SDUs (Service Data Units) that has been transmitted and acknowledged via the connection in the DL direction, utilized MCS (Modulation and Coding Scheme) and reported transmission rank.

It is noted that in other implementations the UE measurements could include only a subset of these information elements and/or additional information elements.

The cell configuration parameters include for each cell:

power boost of CRS (Cell specific Reference Signals),

DL bandwidth, maximum DL transmit power per antenna reference point of the access node, for all DL channels in all simultaneously used transmit branches, DL frequency channel identifier of the cell, e.g., in terms of or NR-ARFCNDL (NR Absolute Radio Frequency Channel Number DL) or EARFCNDL (E-UTRA Absolute Radio Frequency Channel Number DL), UL power control parameters for PUSCH (Physical Uplink Shared Channel) and PUCCH (Physical Uplink Control Channel), including a (pathloss compensation factor) for power control of the PUSCH, $P_{0\_PUSCH}$ (nominal component of the UE transmit power for PUSCH), and $P_{0\_PUCCH}$ (nominal component of the UE transmit power for the PUCCH).

Neighbor relations for PCI matching.

It is noted that in other implementations the cell configuration parameters could include only a subset of these information elements and/or additional information elements.

The cell physical parameters include for each cell:
antenna directivity of an antenna of the access node, e.g., parameters indicating main transmission directions of the antenna,
number of antenna ports for DL transmission.

It is noted that in other implementations the physical parameters could include only a subset of these information elements and/or additional information elements.

The information from the measurement data and the deployment data may be used for calculating the following radio metrics for each connection:

A pathloss of the connection may be calculated as:

$$L_{sa} = Tx_{power} - 10 \log_{10}(12*PRBs) - 10 \log_{10}(num_{antenna\_ports}) + crsGain - RSRP_s,$$

where $Tx_{power}$ is the maximum transmission power at the antenna reference point, PRBs is the available number of PRBs, $num_{antenna\_ports}$ is the number of antenna ports in DL transmission, crsGain is the power boost of the CRS in dB, and RSRP s is the RSRP of the serving cell in dBm.

A carrier to interference ratio (C/I) of the connection may be calculated as:

$$\frac{C}{I} = \frac{RSRP_S}{\sum_{n=1}^{8} RSRP_n},$$

where $RSRP_S$ denotes the RSRP of the serving cell and RSRP denotes the RSRP of the n-th neighbor cell.

A UL transmit power of the UE per RB may be calculated as:

$$P_{UE,RB} = P_{0\_PUSCH} + \alpha \cdot L_{sa}.$$

The information from the measurement data and the deployment data may be used for calculating the following performance metrics for each connection:

A number of REs (resource elements) user per connection may be calculated as:

$$RE_c = \frac{DV}{UBPS},$$

where DV is the data volume bits, transmitted via the connection in the DL direction and acknowledged and UBPS denotes the number of useful bits per symbol which can be calculated based on the Modulation Coding Scheme (MCS) assigned to the connection according to its C/I and reported transmission rank.

A DL PRB utilization may be calculated as:

$$DL\ PRB_{util} = 100 * \frac{RE_U}{RE_A},$$

where $RE_U$ is the aggregation of the REs used per connection for the cell, i.e., the sum over $RE_C$ for all connections simultaneously maintained in the cell, and $RE_A$ is the number of REs available per cell based on the available DL bandwidth, further considering potential technology overhead.

The network emulator 330 may be used to estimate the same metrics as mentioned above, however considering assumed changes of the DL transmit power for one or more of the cells 101, 102, 103, 104. For this purpose, the network emulator 330 may individually consider the connections covered in the measurement data and use the measured RSRP values, both for the serving cell and the neighbor cell(s), to estimate updated RSRP values reflecting the changed DL transmit power(s). This can be achieved by changing the measured RSRP from a cell in proportion to the change of the DL transmit power of the cell. Then, the C/I value for the connection may be updated based on the updated RSRP values. Further, the updated RSRP values are used to identify if the connection is to be assigned to a new serving cell. For example, if the updated RSRPs indicate that the RSRP from a neighbor cell is higher than the RSRP from the original serving cell, this neighbor cell may be declared as the new serving cell and the original serving cell considered as a neighbor cell. This part of the emulation may also be regarded as a virtual handover of the connection and may follow handover rules as applied in the wireless communication network. If the wireless communication network utilizes multiple frequency layers, the emulation may also involve redistributing the connections among the frequency layers, following mobility rules applied in the wireless communication network, e.g., rules for inter-frequency handovers. Further, if one or more connections are assigned to new serving cells, the network emulator may also update the corresponding UL transmit power per RB for each of these connections, e.g., by recalculating the value of $L_{sa}$ for the parameters applicable for the new serving cell. Then also the number of REs used per connection and the DL PRB utilization may be updated accordingly.

Figure 4:
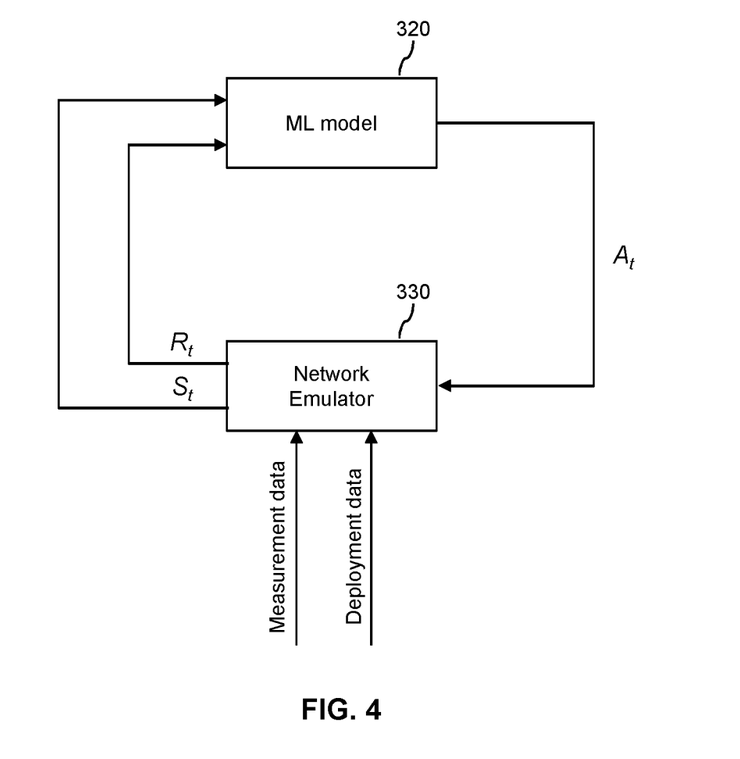
FIG. 4 schematically illustrates training of an ML model according to an embodiment.

FIG. 4 further illustrates the utilization of the network emulator 330 in training the ML model 320 applied by the optimizer 310. In the illustrated example, the ML model 320 is assumed to be based on deep reinforcement learning, which involves maximizing a reward function, denoted as $R_t$, where t is an index of iteration performed in the training process. The ML model 320 may thus be based on combination of a deep learning, in particular using a neural network, with reinforcement learning. Deep reinforcement learning algorithms utilized in the ML model 410 can for example be implemented as described in "An Introduction to Deep Reinforcement Learning (Foundations and Trends(r) in Machine Learning)" by von V. François-Lavet et al., Now Publishers Inc. (2019).

As illustrated in FIG. 4, the training of the ML model 320 is based on using the network emulator 330 to provide training data to the ML model 320. The training data include the reward function $R_t$ and corresponding state information $S_t$, consisting of the above-mentioned metrics for each cell 101, 102, 103, 104 of the cluster. Based on the value of the reward function $R_t$, and the state information $S_t$, the ML model 320 proposes actions $A_t$, which specifically include proposed changes of one or more of the DL transmit powers. The proposed changes $A_t$ aim at maximizing the reward function $R_t$. The proposed actions $A_t$ are then considered by the network emulator 330 when computing the state information $S_{t+1}$ and reward function $R_{t+1}$ for the next iteration. In the illustrated reinforcement algorithm, the ML model 320 thus has the role of an agent that proposes the actions $A_t$ for maximizing the reward function, and the network emulator has the role of an environment interacting with the agent. The possible actions include, for each cell: increasing the DL transmit power by a step size, decreasing the DL transmit power by a step size, and maintaining the DL transmit power. The step size may be configurable. For the training process, it is also possible to use randomly selected step sizes.

The reward function $R_t$ should reflect an performance improvement or performance degradation caused by the proposed action $A_t$. In the illustrated example, the reward function $R_t$ is composed by a global component reflecting an overall performance improvement or degradations in the cluster and a local component reflecting local performance improvements or degradations in the individual cells. The global component and the local component are defined to each contribute 50% to the reward function $R_t$. However, it is noted that these contributions could also be set in a different way, e.g., by either choosing a higher contribution of the global component or a higher contribution of the local component. In the illustrated example, the reward function is defined as follows:

$$R_t = w1 \cdot P_T + w_2 \cdot BCI + w_3 OOC + w_4 \cdot HUR + w_5 \cdot ULI.$$

Here $P_T$ denotes a total power corresponding to the sum of all DL transmit powers in the cluster, expressed in dBm. Further, BCI denotes a rate of connections with bad C/I, i.e., the number of connections with C/I value below a threshold, normalized by the total number of connections in the cluster. Further, OOC denotes a DL out of coverage rate, i.e., the amount of connections with RSRP below a threshold, normalized by the total number of connections in the cluster. Further, HUR denotes a rate of high utilization, defined in terms of a number of time windows where the DL PRB utilization is above a threshold or the number of connections is above a threshold, normalized by the total number of time windows in the considered data. Here, the considered time window size could for example be 10 s. Further, ULI denotes a UL interference rate, defined in terms the total number of connections that are creating UL interference in neighbor cells, normalized by the total number of connections in the cluster. Here, a connection is considered to create UL interference in a neighbor cell if the total received power from this connection is above a threshold, defined as the configured $P_{0\_PUSCH}$ value of this cell minus an offset. Further, w1, w2, w3, w4, and w5 denote weights which allow to customize the definition of optimum network performance.

In addition to the above-mentioned radio metrics and performance metrics, the state information may in particular include the following information per cell of the cluster: The number of connections below an RSRP threshold. When computing the reward function, the these connections are considered to be out of coverage. The number of the connections with C/I value below a threshold, i.e., the number of connections with bad C/I. The aggregated RSRP from interfering cells, averaged across all measurement reports. Average RSRP measured on the connections of the cell. Applied DL transmit power. Maximum DL transmit power. Power step of the proposed change of DL transmit power, which is used in the training process. The power step may be selected randomly per iteration of the training process. By doing so, the ML model may be trained to find the most convenient actions for different power step values. The number of data records indicating DL interference, defined by the condition that the RSRP of the serving cell minus the RSRP per neighbor is below a threshold of 10 dB. The number of connections that are creating UL interference in the neighbor cell, defined by the condition that in in the neighbor cell the RSRP of the connection is higher than $P_{0\_PUSCH}$ minus an offset. The number of UL connections that are transmitting at full power. The number of DL connections without any detected neighbor cell. The number of time windows with PRB utilization above a threshold and a minimum number of RRC (Radio Resource Control) connections, the number of time windows with RRC connections above a threshold. The top-five neighbor cells, defined as the cells with the highest number of connections that fulfill the condition that the RSRP of the serving cell minus the RSRP of the neighbor cell is below dB. Metrics from a) to n) for each one of them. Further, if there are co-sector cells, the state information may include a ratio of the number of connections of the co-sector cell and the number of the connections of the cell, preferably limited to the three co-sector cells having the highest ratio.

Figure 5A:
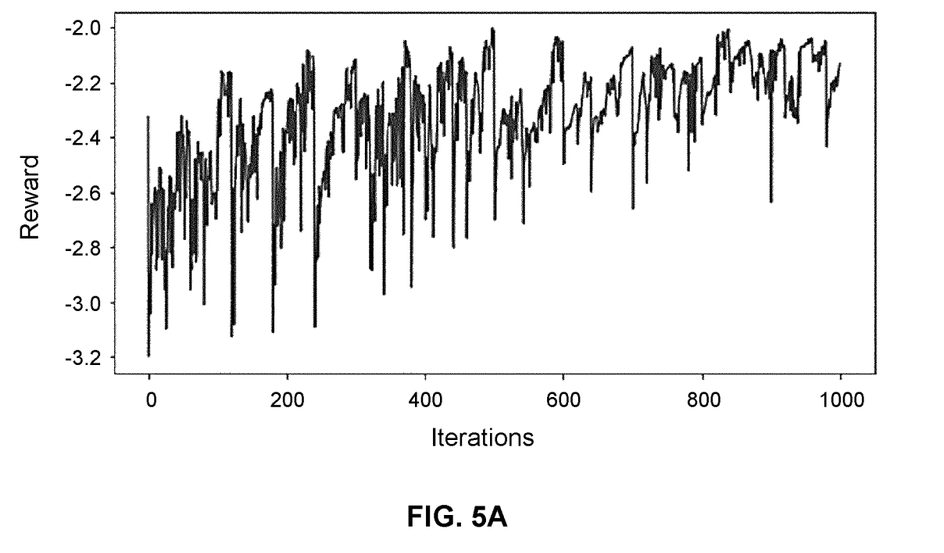
FIG. 5A shows an exemplary course of a reward function during training of an ML model according to an embodiment.
Figure 5B:
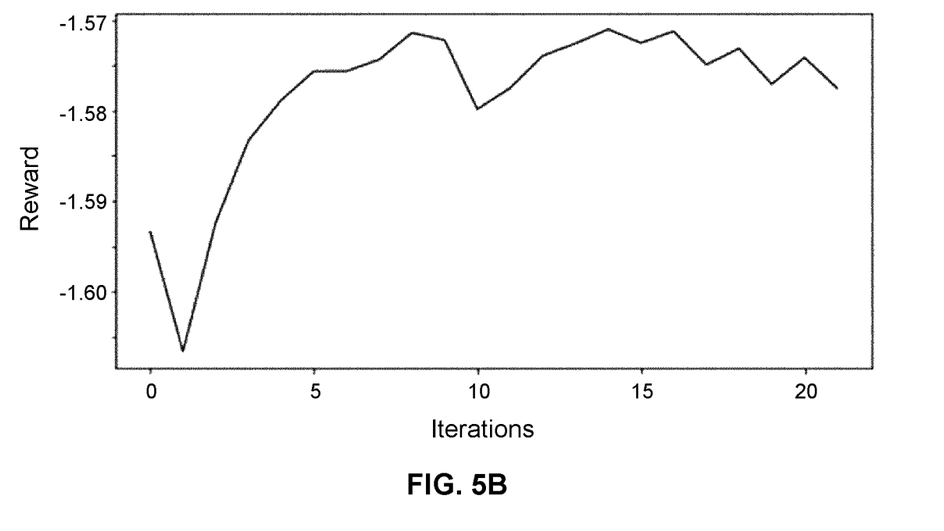
FIG. 5B shows an exemplary course of a reward function during optimization of based on an ML model according to an embodiment.

FIGS. 5A and 5B shows an example illustrating how the reward function evolves in a test scenario considering 250 cells of an LTE network. In this case, the goal of the optimization was to reduce the total DL transit power in the cluster, without impacting the network performance. FIG. 5A shows the course of the reward function over iterations of the training process, based on measurement data aggregated over three weeks and utilizing randomly selected power steps and randomly selected maximum and minimum power levels. FIG. 5B shows the course of the reward function in s subsequent optimization phase, based on weekly arriving new measurement data and using a configured power step size of 1 dB and maximum and minimum power levels given by governmental constraints. As can be seen, the training of the ML model allows for efficient subsequent optimization in few iterations. In particular, the reward function reaches a maximum after 14 iterations, but is close to the maximum already after 5 iterations. The optimization allowed for reducing the overall DL transmit power by about 16%, while maintaining at least stable performance. In fact, the optimization actually even showed improvements in the bad C/I rate (from 2.4% to 2.2%), high DL utilization rate (from 3.5% to 3%), and UL interference rate (from 29.9% to 29.6%), and DL out-of-coverage rate (from 0.79% to 0.71%).

Figure 6:
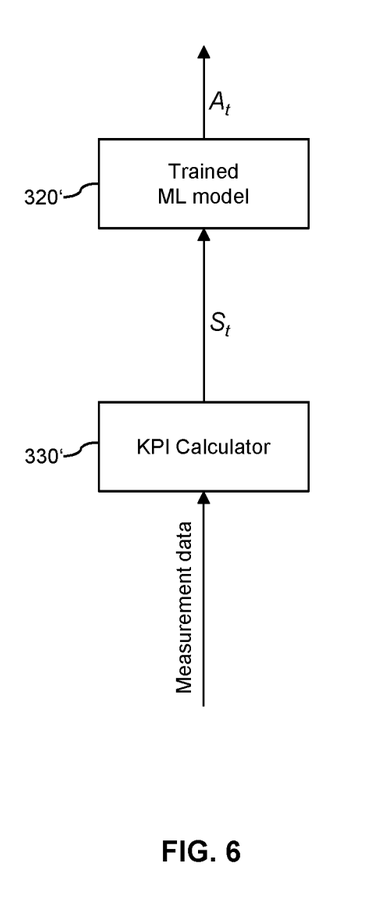
FIG. 6 schematically illustrates utilization of a trained ML model according to an embodiment.

FIG. 6 schematically illustrates an example of offline utilization of the trained ML model 320' for optimization of the DL transmit powers. In this case, it is assumed that the trained ML model 320', e.g., after being trained as explained in connection with FIG. 4, is applied to newly collected measurement data to derive optimized DL transmit powers. In this cases, a KPI calculator 330' is used to derive KPIs corresponding to the state information S t from the measurement data, and this state information is supplied to the trained ML model 320', which outputs actions $A_t$ corresponding to the optimized DL transmit powers. The KPI calculator 330' may be implemented by the network emulator 330 utilize corresponding functionalities for calculating the above-mentioned radio metrics, performance metrics and other elements of the state information $S_t$ from the measurement data. However, in this case, emulation of the effects of changes of the DL transmit powers may be omitted. In other variants, the emulation may be utilized as well, to assess the most appropriate changes of the DL transmit powers in an iterative manner.

Figure 7:
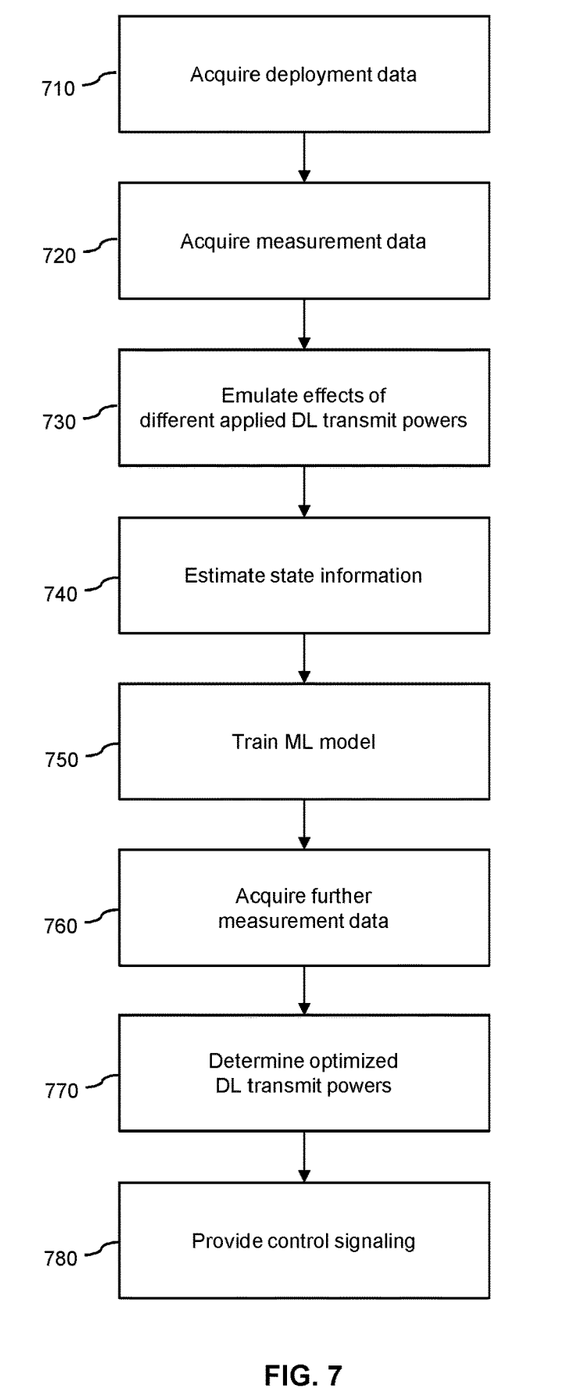
FIG. 7 shows a flowchart for illustrating a method according to an embodiment.

FIG. 7 shows a flowchart for illustrating a method of controlling transmissions in a wireless communication network. The method of FIG. 7 may be utilized for implementing the illustrated concepts in a node of the wireless communication network. The node may implement a management system or planning tool, such as the above-mentioned management system 300.

If a processor-based implementation of the node is used, at least some of the steps of the method of FIG. 7 may be performed and/or controlled by one or more processors of the node.

Such node may also include a memory storing program code for implementing at least some of the below described functionalities or steps of the method of FIG. 7.

At step 710, deployment data are acquired. The deployment data describe a deployment of a cluster of cells of the wireless communication network. The cluster may correspond to a configured subset of all cells of the wireless communication network. In some cases, the cluster could also include all cells of the wireless communication network.

For each of the cells of the cluster the deployment data may indicate neighbor relationships to other cells in the cluster, e.g., in terms of identifiers of neighboring cells. Such identifier could for example be a PCI, NCI or ECI.

Further, for each of the cells of the cluster the deployment data may include one or more parameters describing directivity of an antenna arrangement provided for serving the cell and/or a number of antenna ports available for downlink transmission.

Further, for each of the cells of the cluster the deployment data may include a DL bandwidth, a utilized DL frequency channel, and/or a maximum DL transmit power.

Further, for each of the cells of the cluster the deployment data may include at least one parameter for UL power control, such as one or more of the above-mentioned parameters a, $P_{0\_PUSCH}$, and $P_{0\_PUCCH}$.

At step 720, measurement data are acquired. The measurement data represent measurements performed with respect to a plurality of connections established between wireless devices and the wireless communication network. The wireless devices may for example correspond to the above-mentioned UEs 10.

The measurement data may include, for each of the connections, a measured DL signal strength of the connection, e.g., in terms of RSRP from the serving cell.

Further, the measurement data may include, for each of the connections, a respective DL signal strength from one or more neighboring cells in the cluster, e.g., in terms of RSRP from the neighboring cell.

Further, the measurement data may include, for each of the connections, identifiers of one or more neighboring cells in the cluster, e.g., in terms of a PCI, NCI, or ECI.

Further, the measurement data may include, for each of the connections, an amount of data transmitted via the connection, e.g., in terms of a number of transmitted and acknowledged SDUs and/or a number of transmitted bit or bytes.

At step based 730, effects of applying different DL transmit powers in at least some cells of the cluster on the plurality of connections are emulated, e.g., using functionalities as explained above for the network emulator. In particular, the effects are emulated based on the on the deployment data acquired at step 710 and the measurement data acquired at step 720.

At step 740, state information for each of the cells is estimated based on the emulated effects, e.g., as explained for the above-mentioned state information $S_t$.

The state information may be based on deriving from the emulated effects, for each of the connections, a DL signal strength of the connection, e.g., in terms of an RSRP observed at the wireless device.

Further, the state information may be based on deriving from the emulated effects, for each of the connections, a respective DL signal strength from one or more neighboring cells in the cluster, e.g., in terms of an RSRP observed at the wireless device.

Further, the state information may be based on deriving from the emulated effects, for each of the connections, a level of interference affecting the connection, e.g., in terms of a C/I value.

Further, the state information may be based on deriving from the emulated effects, for each of the connections, an uplink transmit power level applied by the wireless device, e.g., by considering one or more UL power control parameters.

Further, the state information may be based on deriving from the emulated effects, for each of the connections, to which cell of the cluster the connection is established, e.g., by considering virtual handovers as explained above.

At step 750, an ML model is trained based on the estimated state information. In particular, the ML model is trained for optimization of the DL transmit powers of the cells of the cluster. Aims of the optimization of the DL transmit powers may be configured, e.g., in terms of a reward function used for the training and optimization.

The ML model may be based on maximizing a reward function. In particular, the ML model may be based on reinforcement learning, specifically deep reinforcement learning.

The reward function may depends on an amount of time in which, for one or more of the cells of the cluster, utilization of available radio resources exceeds a threshold, e.g., considered in terms of the above-mentioned DL PRB utilization.

Further, the reward function may depend on a number of the connections for which UL interference created in one or more neighboring cells in the cluster exceeds a threshold.

Further, the reward function may depend on a number of the connections for which DL signal strength level is below a threshold, e.g., DL signal strength considered in RSRP from the serving cell.

Further, the reward function may depend on a number of the connections for which a ratio of DL signal strength to interference level is below a threshold, e.g., considered in terms of the C/I value.

Further, the reward function may depend on a sum of the DL transmit powers of the cells of the cluster.

At step 750, further measurement data may be acquired. The further measurement data represent measurements performed with respect to a plurality of further connections established between wireless devices, such as the above-mentioned UEs 10, and the wireless communication network. These wireless devices may at least in part differ from the wireless devices considered in the measurement data acquired at step 720.

The further measurement data may include, for each of the further connections, a measured DL signal strength of the connection, e.g., in terms of RSRP from the serving cell.

Further, the further measurement data may include, for each of the connections, a respective DL signal strength from one or more neighboring cells in the cluster, e.g., in terms of RSRP from the neighboring cell.

Further, the further measurement data may include, for each of the further connections, identifiers of one or more neighboring cells in the cluster, e.g., in terms of a PCI, NCI, or ECI.

Further, the further measurement data may include, for each of the further connections, an amount of data transmitted via the further connection, e.g., in terms of a number of transmitted and acknowledged SDUs and/or a number of transmitted bit or bytes.

At step 760, optimized DL transmit powers of the cells of the cluster may be determined based on the trained ML model. In some scenarios, the optimized DL transmit powers may be determined based on the trained ML model and the further measurement data acquired at step 750. In some scenarios, the optimized DL transmit powers may be determined during the training of step 740. In some scenarios, the optimized DL transmit powers may be determined in an offline mode, without further training of the ML model based on the further measurement data.

At step 770, control signaling may be provided. The control signaling may indicate the optimized DL transmit powers to access nodes of one or more cells of the cluster, e.g., to one or more of the above-mentioned access nodes, 111, 112, 113, 114. In some scenarios, the control signaling may be transmitted via one or more nodes of a CN od the wireless communication network.

Figure 8:
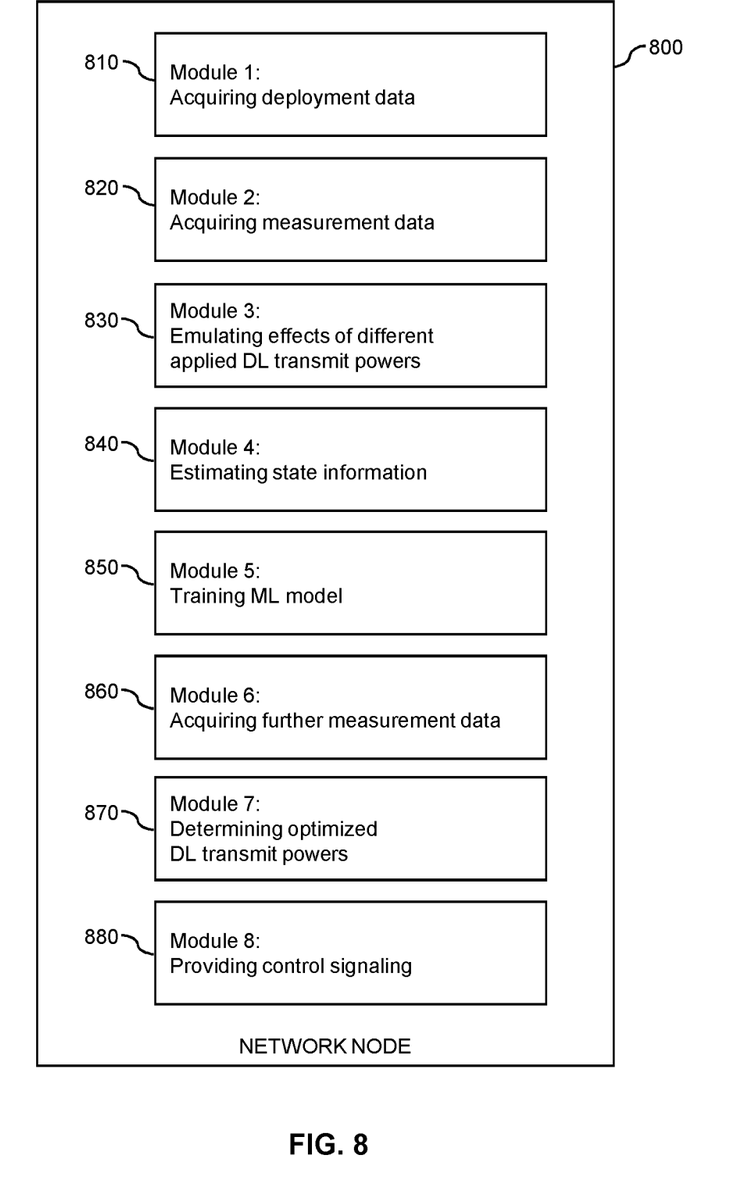
FIG. 8 shows an exemplary block diagram for illustrating functionalities of a network node implementing functionalities corresponding to the method of FIG. 7.

FIG. 8 shows a block diagram for illustrating functionalities of a network node 800 which operates according to the method of FIG. 7. The network node 800 may for example implement a management system or at least a part of a management system, such as the above-mentioned management system 300. As illustrated, the network node 800 may be provided with a module 810 configured to acquire deployment data, such as explained in connection with step 710. Further, the network node 800 may be provided with a module 820 configured to acquire measurement data, such as explained in connection with step 720. Further, the network node 800 may be provided with a module 830 configured to emulate effects of different DL transmit powers, such as explained in connection with step 730. Further, the network node 800 may be provided with a module 840 configured to train an ML model, such as explained in connection with step 740. Further, the network node 800 may optionally be provided with a module 850 configured to acquire further measurement data, such as explained in connection with step 750. Further, the network node 800 may optionally be provided with a module 860 configured to determine optimized DL transmit powers, such as explained in connection with step 760. Further, the network node 800 may optionally be provided with a module 870 configured to provide control signaling, such as explained in connection with step 760.

It is noted that the network node 800 may include further modules for implementing other functionalities, such as known functionalities of a management system or planning tool.

Further, it is noted that the modules of the network node 800 do not necessarily represent a hardware structure of the network node 800, but may also correspond to functional elements, e.g., implemented by hardware, software, or a combination thereof.

Figure 9:
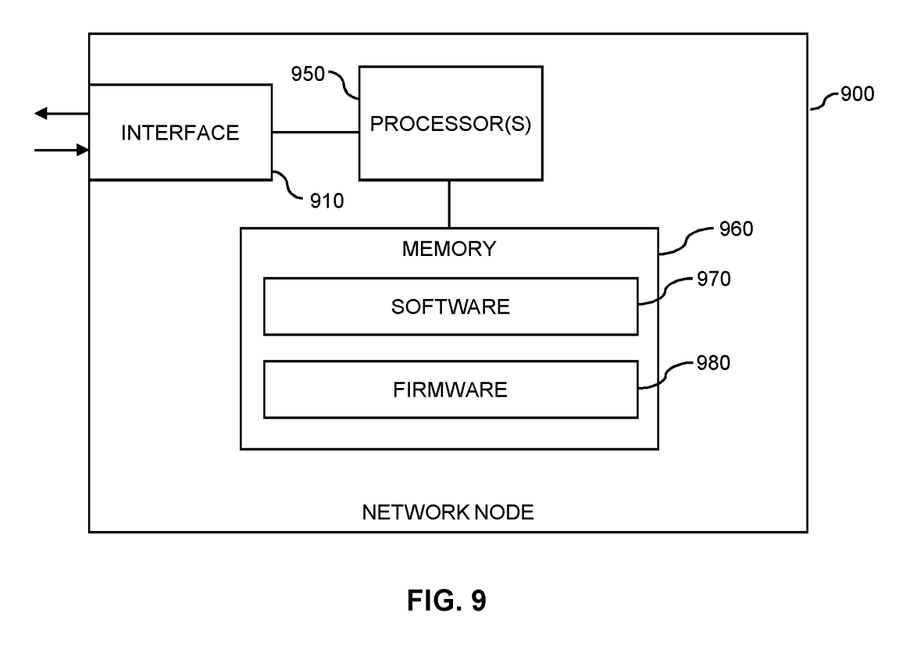
FIG. 9 schematically illustrates structures of a network node according to an embodiment.

FIG. 9 illustrates a processor-based implementation of a network node 900 which may be used for implementing the above-described concepts. For example, the structures as illustrated in FIG. 9 may be used for implementing a management system implementing the illustrated concepts, such as the management system 300. In some scenarios, also a system of multiple network nodes 900 with structures as illustrated in FIG. 9 may be used implementing the above-described concepts.

As illustrated, the network node 900 includes one or more interfaces 910. These interfaces 910 may for example be used for enabling communication with one or more other nodes.

Further, the network node 900 may include one or more processors 950 coupled to the interface(s) 910 and a memory 960 coupled to the processor(s) 950. By way of example, the interface(s) 910, the processor(s) 950, and the memory 960 could be coupled by one or more internal bus systems of the network node 900. The memory 960 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 960 may include software 970 and/or firmware 980. The memory 960 may include suitably configured program code to be executed by the processor(s) 950 so as to implement the above-described functionalities of a network node, such as explained in connection with FIGS. 7 and 8.

It is to be understood that the structures as illustrated in FIG. 9 are merely schematic and that the network node 900 may actually include further components which, for the sake of clarity, have not been illustrated, e.g., further interfaces or processors. Also, it is to be understood that the memory 960 may include further program code for implementing known functionalities of a network node, e.g., known functionalities of a management system or planning tool for a 3GPP network. According to some embodiments, also a computer program may be provided for implementing functionalities of the network node 900, e.g., in the form of a physical medium storing the program code and/or other data to be stored in the memory 960 or by making the program code available for download or by streaming.

As can be seen, the concepts as described above may be used for efficiently utilizing ML for optimization of DL transmit powers. Accordingly, benefits of artificial intelligence (AI) can be exploited for addressing a complex multi-objective problem. This is enabled by utilizing the emulation of effects of changes in the DL transmit powers to derive training data from existing measurement data, e.g., UE traces from CTRs. A need to conduct field trials with different applied DL transmit powers can be avoided. Further, it is also possible to consider how service areas are reshaped through modifications of one or more DL transmit powers. Various types of cell-association or cell changes can be considered, e.g., in accordance with rules defined for intra-frequency handovers or rules defined for inter-frequency handovers.

Further, the utilization of deep reinforcement learning may help to accelerate the optimization process. A flexibly configurable reward function may allow to customize objectives of optimization as needed. Further, the trained ML model may be reused, e.g., by porting from one network layout to another. After such porting of the trained ML model, learning can continue based on measurement data acquired in the new layout.

Further, usage of the network emulator as an environment in the training process, may enable fast convergence during the training phase, in particular as compared to scenarios where measurement data covering physical changes of the applied DL transmit powers.

It is to be understood that the examples and embodiments as explained above are merely illustrative and susceptible to various modifications. For example, the illustrated concepts may be applied in connection with various wireless communication network technologies, without limitation to the NR or LTE technology.

Moreover, it is to be understood that the above concepts may be implemented by using correspondingly designed software to be executed by one or more processors of an existing device or apparatus, or by using dedicated device hardware. Further, it should be noted that the illustrated nodes may each be implemented as a single device or as a system of multiple interacting devices or modules, e.g., as a cloud system.

The invention claimed is:

1. A computer-implemented method of controlling transmissions in a wireless communication network, the method comprising:

acquiring deployment data describing a deployment of a cluster of cells of the wireless communication network;

acquiring measurement data representing measurements performed with respect to a plurality of connections established between wireless devices and the wireless communication network;

based on the deployment data and the measurement data, emulating effects of applying different downlink transmit power values in at least some cells on the plurality of connections, wherein emulating the effects comprises, for each of the plurality of connections, determining to which cell of the cluster the connection would be established under the different downlink transmit power values;

based on the emulated effects, estimating state information for each of the cells;

based on the estimated state information, training a machine learning model for optimization of downlink transmit power values of the cells;

applying the trained machine learning model to determine optimized downlink transmit power values of the cells; and providing control signaling for implementing the optimized downlink transmit power values.

2. The method according to claim 1, wherein the state information is based on deriving from the emulated effects, for each of the connections, a downlink signal strength of the connection.

3. The method according to claim 1, wherein the state information is based on deriving from the emulated effects, for each of the connections, a respective downlink signal strength from one or more neighboring cells in the cluster.

4. The method according to claim 1,
wherein the state information is based on deriving from the emulated effects, for each of the connections, a level of interference affecting the connection.

5. The method according to claim 1,
wherein the state information is based on deriving from the emulated effects, for each of the connections, an uplink transmit power level applied by the wireless device.

6. The method according to claim 1,
wherein the state information is based on deriving from the emulated effects, for each of the connections, a serving cell of the cluster resulting from a virtual handover performed according to handover rules of the wireless communication network.

7. The method according to claim 1,
wherein the machine learning model is based on maximizing a reward function.

8. The method according to claim 7, wherein the reward function depends on an amount of time in which, for one or more of the cells of the cluster, utilization of available radio resources exceeds a threshold.

9. The method according to claim 7, wherein the reward function depends on a number of the connections for which uplink interference created in one or more neighboring cells in the cluster exceeds a threshold.

10. The method according to claim 7, wherein the reward function depends on a number of the connections for which downlink signal strength level is below a threshold.

11. The method according to claim 7, wherein the reward function depends on a number of the connections for which a ratio of downlink signal strength to interference level is below a threshold.

12. The method according to claim 7, wherein the reward function depends on a sum of the downlink transmit power values of the cells of the cluster.

13. The method according to claim 1, wherein the measurement data comprise, for each of the connections, a measured downlink signal strength of the connection.

14. The method according to claim 1,
wherein the measurement data comprise, for each of the connections, a respective downlink signal strength from one or more neighboring cells in the cluster.

15. The method according to claim 1,
wherein the measurement data comprise, for each of the connections, identifiers of one or more neighboring cells in the cluster.

16. The method according to claim 1,
wherein the measurement data comprise, for each of the connections, an amount of data transmitted via the connection.

17. The method according to claim 1,
wherein for each of the cells of the cluster the deployment data indicate neighbor relationships to other cells in the cluster.

18. The method according to claim 1,
wherein for each of the cells of the cluster the deployment data comprise: one or more parameters describing directivity of an antenna arrangement provided for serving the cell and/or a number of antenna ports available for downlink transmission.

19. The method according to claim 1,
wherein for each of the cells of the cluster the deployment data comprise: a downlink bandwidth, a utilized downlink frequency channel, and/or a maximum downlink transmit power value.

20. The method according to claim 1,
wherein for each of the cells of the cluster the deployment data comprise at least one parameter for uplink power control.

* * * * *